US005996716A

United States Patent [19]

Montiglio et al.

[11] Patent Number: 5,996,716

[45] Date of Patent: Dec. 7, 1999

[54] ADJUSTABLE WHEELCHAIR

[75] Inventors: Michel Montiglio, Ste-Foy; Bruno Martel, St-Nicolas, both of Canada

[73] Assignee: Orthofab, Quebec, Canada

[21] Appl. No.: 08/736,656

[22] Filed: Oct. 25, 1996

[51] Int. Cl.[6] ...... B60K 1/02

[52] U.S. Cl. ...... 180/65.5; 180/6.5; 180/907; 280/250.1; 280/124.111; 297/317

[58] Field of Search ...... 280/124.111, 124.11, 280/124.166, 124.177, 124.169, DIG. 5, 250.1; 180/6.48, 6.5, 65.1, 216, 907, 65.5; 297/317, 329

[56] References Cited

U.S. PATENT DOCUMENTS

| | | | |
|---|---|---|---|
| 2,838,124 | 6/1958 | Cramer, Jr. | 280/124.111 X |
| 3,605,929 | 9/1971 | Rolland | 280/124.111 X |
| 3,618,968 | 11/1971 | Greer | 280/47.11 |
| 3,664,450 | 5/1972 | Udden et al. | 180/907 X |
| 3,672,722 | 6/1972 | Murcott | 297/437 |
| 3,749,192 | 7/1973 | Karchak, Jr. et al. | 180/6.5 |
| 4,082,348 | 4/1978 | Haury | 297/45 |
| 4,351,540 | 9/1982 | Minnebraker | 280/242 |
| 4,592,570 | 6/1986 | Nassiri | 280/650 |
| 4,613,151 | 9/1986 | Kielczewski | 280/650 |
| 4,614,246 | 9/1986 | Masse et al. | 180/6.5 |
| 4,730,842 | 3/1988 | Summers et al. | 280/638 |
| 4,767,133 | 8/1988 | Yamada | 280/124.111 |
| 4,813,693 | 3/1989 | Lockard et al. | 280/42 |
| 4,955,624 | 9/1990 | Jeun-Long | 280/42 |
| 5,020,816 | 6/1991 | Mulholland | 280/250.1 |

*Primary Examiner*—Lanna Mai
*Assistant Examiner*—Michael Mar
*Attorney, Agent, or Firm*—Diller, Ramik & Wight, PC

[57] ABSTRACT

The present invention relates to a new wheelchair that is adjustable in length, width and height in order to be adapted to different users of different sizes or to a child growing up. The wheelchair comprises a T-shaped rear frame, a T-shaped front frame and a seat assembly. Each T-shaped frame is made of a long arm and two short arms. The rear frame and the front frame are telescopically connected together in such a manner so as to articulate both frame together and to allow to adjust the distance between the front and rear wheels. The two rear wheels are adjustably mounted to the rear frame so that the distance separating the wheels may be adjusted. The seat assembly is mounted on the rear frame and is adjustable in height. The front wheels are mounted on the front frame at each end of the two short arms.

17 Claims, 5 Drawing Sheets

ADJUSTABLE WHEELCHAIR

BACKGROUND OF THE INVENTION (a) Field of the Invention

The invention relates to a wheelchair and, more particularly, to a new wheelchair that is adjustable in length, width and height in order to be adapted to different users of different sizes or to a child growing up.

(b) Description of Prior Art

There are many different kinds of wheelchairs, many of which are provided with features that allow them to be adapted to different situations or different users.

Presently available wheelchairs are not provided with adjustable characteristics in such a manner that the same wheelchair could be used comfortably or with security by a child or an adult. Most of the wheelchairs are adapted to accept or adapt to small variations in weight or size. In some cases the wheelchairs, by construction, will accept small variation and in some other cases the wheelchairs are adapted to accept larger variations by using different interchangeable and adaptable components, such as the wheelchairs described in U.S. Pat. No. 4,351,540.

Most wheelchairs have rigid frames and have little or no suspension. On uneven ground, a rider will be subject to a rough ride, unless the wheelchair is equipped with a suspension, and still, such wheelchair cannot provide a smooth ride.

Some wheelchairs are adjustable in length allowing for the distance between the front and rear wheels to be adjusted. For example, U.S. Pat. No. 4,892,166 proposes a wheelchair for the handicapped, and in particular to a novel means for removably coupling front wheel portions and rear wheel portions to obtain assembled wheelchairs having various different functions. In one embodiment of the invention, the connection between the front and the rear portions are provided by telescopically related horizontal square tubes.

Some other wheelchairs are provided with adjustable seats or other devices allowing them to be adjusted in height to fit different users of different heights. U.S. Pat. No. 3,618,968 proposes a patient-operated wheelchair in which vertical adjustment of position is provided so that the user of the wheelchair in a seated position would be able to elevate himself so that his upper torso would be at a height equivalent to a standing position.

U.S. Pat. No. 3,672,722 discloses a wheelchair having a seat which can be adjustably positioned between the frame members of the wheelchair Some wheelchairs are adjustable in width allowing for the transverse distance between the side wheels to be adjusted. For example, U.S. Pat. No. 4,592,570 proposes an ultra light chair having a seat frame separate from a main frame with seat mountings permitting longitudinal, tilt and height adjustment of the seat on the main frame.

U.S. Pat. No. 4,613,151 discloses a wheelchair adapted to provide enhanced mobility for an occupant together with making ground level activities available. The wheelchair comprises a frame that is adapted to be extended upwards or collapsed on itself in order to raise or lower the seat of the wheelchair.

U.S. Pat. No. 4,082,348 proposes an adjustable wheelchair which facilitates independent seat height and width adjustment to accommodate varying wheelchair size needs.

U.S. Pat. No. 4,730,842 proposes an adjustable wheelchair to accommodate changes in the size of an individual, such as a growing child. Accordingly, the seat portion of the wheelchair is adjustable in width continuously over a widely defined range. Furthermore, the seat of the wheelchair is adjustable vertically.

U.S. Pat. No. 4,955,624 proposes a wheelchair with a height-adjustable seat.

U.S. Pat. No. 4,813,693 proposes a wheelchair for a child which grows and expands with the child. The wheelchair may be used to custom-fit wheelchairs to adults, enabling it to be used by adults or children of different sizes. Accordingly, the wheelchair is adjustable in width while retaining constant height.

U.S. Pat. No. 5,020,816 proposes a wheelchair having opposite side frames which comprise individual frame sections which are connected by a longitudinally and angularly adjustable joint allowing for adjustable width of the wheelchair.

As apparent from the above, many adjustable devices exist for wheelchairs. The most common device is the adjustability which allows the seat to be raised, lowered, tilted or inclined in different positions for different users. Some other wheelchairs, in order to allow expansion with the user, are provided with chairs of adjustable length. In this case, the front wheels may be adjusted more or less distant from the rear wheels. In some cases, an adjustment is provided to increase or decrease the distance between the two main wheels of the wheel chair, that is generally the rear wheels.

In any event, none of the prior art described above discloses a wheelchair which is capable of being adjusted in length, in width and in height either by elevated or lowering the seat or increasing or lowering the distance between either the rear set of wheels or between the rear and the front set of wheels or of all these possibilities altogether.

SUMMARY OF THE INVENTION

It is an aim of the present invention to provide an adjustable wheelchair that can allow for a child or an adult to be stable and comfortable even on uneven or rough grounds.

A further aim of the present invention is to provide a wheelchair that maintains good stability while having a minimal bulk size compared to the bulk size of any user.

Another aim of the present invention is to provide a wheelchair that would allow for maximum adherence of the wheels to the ground, even over rough ground.

A further aim of the present invention is to provide a wheelchair with a torque articulation between rear and front wheels to reduce to a minimum the skidding of inside powered wheels in a curve.

A further aim of the present invention is to provide an adjustable wheelchair that may be adjusted in length, in width and in height in order to increase the stability and the comfort of a user.

In accordance with the present invention there is provided a wheelchair comprising a rear frame, a front frame and seating means. The rear frame has a longitudinal axis and comprises at least two parallel wheels rotatably mounted on the rear frame and the axis of the wheels is at right angle to the longitudinal axis of the frame. The front frame is rotatably connected to the rear frame about the longitudinal axis and comprises at least a pair of wheels, and torque means resisting the rotation of the front frame in relation to the rear frame. The seating means comprises a seating assembly and a back rest. The seating means are mounted on the rear frame of the wheelchair.

In accordance with the present invention there is also provided a wheelchair comprising a rear T-shaped frame and a front T-shaped frame. The rear T-shaped frame is made of two short arms and a first long arm. The first long arm extends in the longitudinal axis. The rear T-shaped frame mounts two motor supports, two motors and two wheels. The two motor supports are each telescopically mounted on one of the two short arms and allow for adjustability of the distance between each motor support. The two motors are each mounted on one of the two motor supports. The two wheels are each mounted on one of the two motors and driven in rotation by the motors. The front T-shaped frame is made of two short arms and a second long arm extending in the longitudinal axis and comprises two caster wheels, a connecting member and resilient members. The caster wheels are each rotatably mounted on one of the two short arms of the front frame.

The connecting member is telescopically mounted to the first long arm. The connecting member and the second long arm, each having a polygonal cross-section, are telescopically arranged with one of the connecting member and the second long arm inserted in the other of the connecting member and the second long arm such that it can rotate about the longitudinal axis. The resilient members are located between the connecting member and the second long arm to allow limited rotation about the longitudinal axis and torque resistance to the rotation.

The resilient members are inserted between the connecting member and the long arm of the front T-shaped frame in such a manner as to create a torque resisting the rotation of the front frame in relation to the rear frame.

BRIEF DESCRIPTION OF THE DRAWINGS

Having thus generally described the nature of the invention, reference will now be made to the accompanying drawings, showing by way of illustration a preferred embodiment thereof, and wherein.

DETAILED DESCRIPTION OF THE INVENTION

Figure 1:
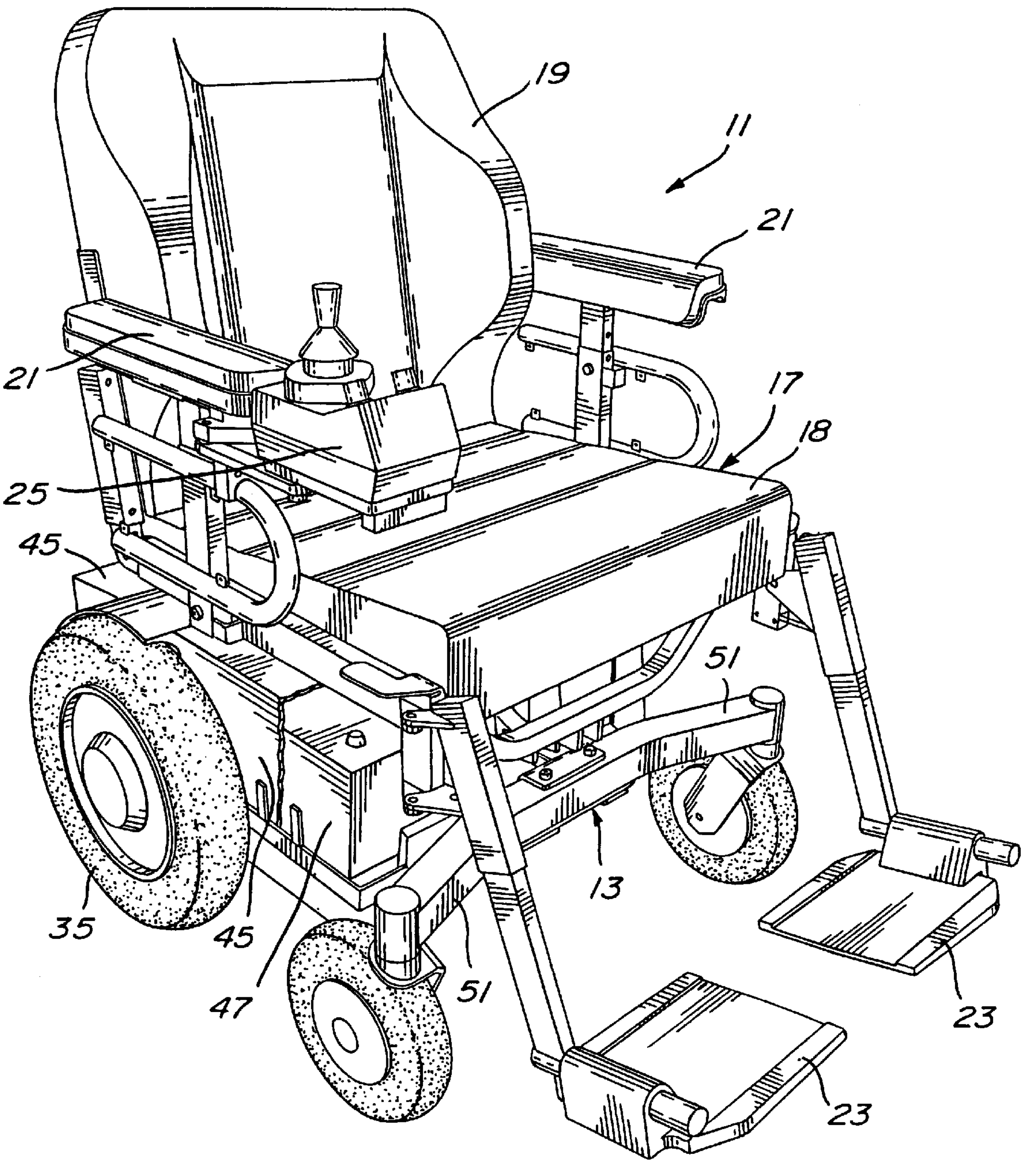
FIG. 1 is a perspective view of a motorized wheelchair according to the invention.
Figure 2:
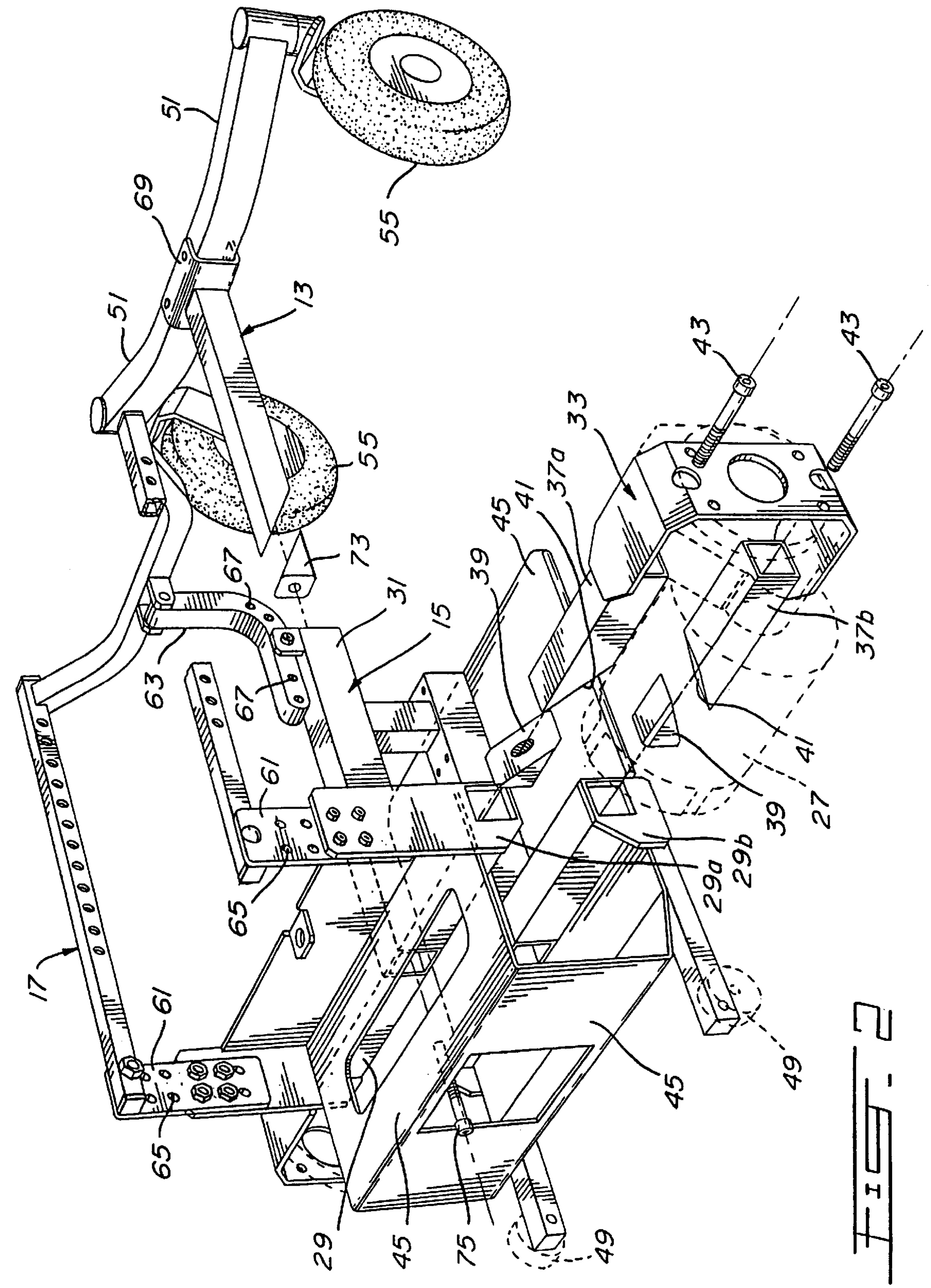
FIG. 2 is a fragmentary exploded view of the motorized wheelchair illustrating a detail of the present invention.

In a preferred embodiment shown in FIGS. 1 and 2, the wheelchair 11 comprises a front T-shaped frame 13, a rear T-shaped frame 15, a seat assembly 17, a backrest 19, two armrests 21, two footrests 23 and a controller unit 25 to control the motors 27.

The rear T-shaped frame 15 is made of two short arms 29 and a first long arm 31. The long arm 31 defines a longitudinal axis. The rear T-shaped frame 15 mounts two motor supports 33 each of which mounts a motor 27 and a wheel 35.

The wheels 35 of the rear frame 15 are mounted either directly or indirectly via a speed reducer on the motor 27. Each motor 27 is preferably operated by a battery 47.

Each motor support 33 includes a pair of arms **37*a* and 37*b* which are telescopically inserted into one of the two short arms 29 of the rear T-shaped frame 15. Each short arm 29 has sub arms 29*a* and 29*b* presenting sockets to accommodate arms 37*a* and 37*b* respectively. Therefore, the distance between each motor support 33, and thereby the wheels 35, may be adjusted allowing to reduce to a minimum the width or bulk size of the wheelchair according to a particular user. Each arm 37*a* and 37*b* of the motor support 33 are fixed within the sockets of arms 29*a* and 29*b* respectively by means of a sliding block 39. The sliding block 39 slides along the angled end 41 of either arm 37*a* and 37*b*. The block 39 is loosened or tightened by a screw 43**. This is similar to the locking device used to lock a handle on a bicycle.

The rear T-shaped frame 15 further comprises a protective plate 45 mounted under and in the rear of the frame 15 to protect the motor 27 and to support two batteries 47, one on each side of the wheelchair 11, for each motor 27.

Two small stabilizer wheels 49 project from the rear of the T-shaped frame 15 as shown in dotted lines in FIG. 2.

The front T-shaped frame 13 as shown in FIGS. 1 to 4B has two short arms 51 and a second long arm 53 and comprises two caster wheels 55, a connecting member 57 and resilient members 59. Each caster wheel 55 is rotatably mounted on one of the two short arms 51 of the front frame 13.

The connecting member 57 is adapted at one end to be fitted around the second long arm 53 and at its other end to be connected to the first long arm 31. The connecting member 57 is fixed to the first long arm 31 in the same manner as the arms 37 of the motor support 33 are fixed to the rear frame 15. The connecting member 57 and the second long arm 53 are preferably of square cross-section and are sized to allow the second long arm 53 to rotate about the longitudinal axis relative to the connecting member 57 when the connecting member 57 is telescoped over the second long arm 53. The connecting member 57 and the second long arm 53 each have a square cross-section but may be of any polygonal cross-section.

Figure 3:
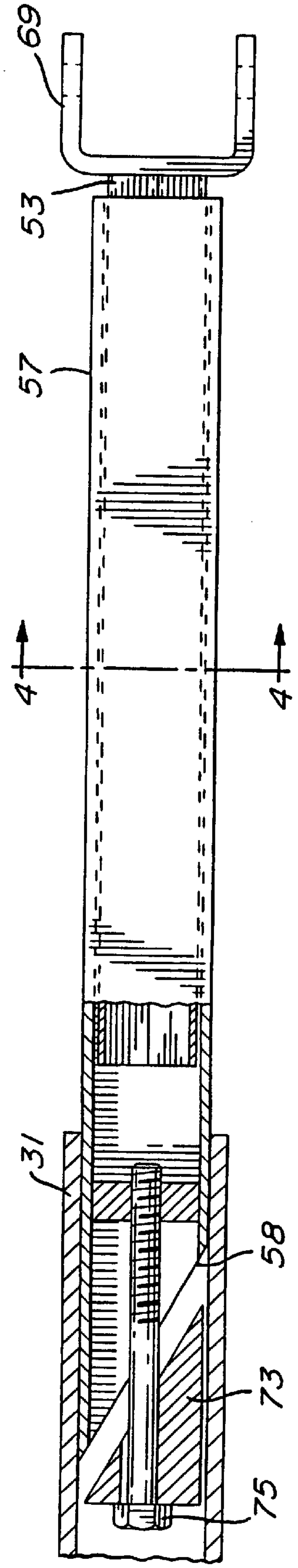
FIG. 3 is a partial cross-sectional view taken along line 3–3 of FIG. 2 illustrating a further detail of the present invention.
Figure 4B:
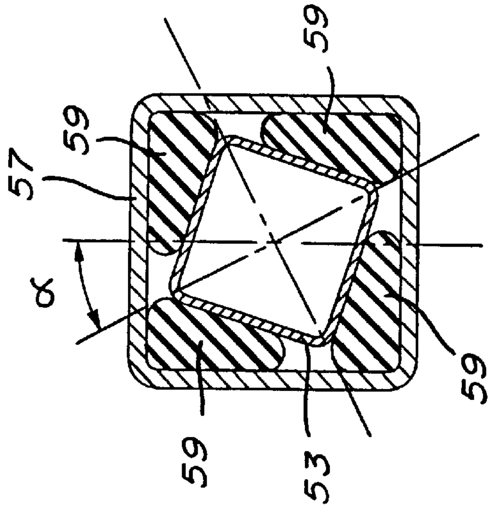
FIG. 4A and 4B are cross-sectional views taken along line 4—4 of FIG. 3 illustrating different operative positions of the detail shown in FIG. 4.
Figure 4A:
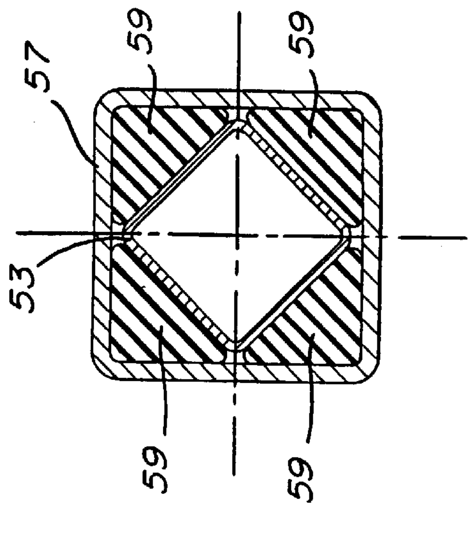

The assembly of the second long arm 53 with the connecting member 57 is illustrated in FIGS. 3, 4A and 4B. As apparent on FIG. 3, a U-clamp 69 is fixed at one end of the second long arm 53. This U-clamp 69 is used to connect with an arcuate tube at about its center, dividing that tube in the two short arms 51 of the front frame 13.

The connecting member 57 is fixed within the first long arm 31 with a sliding block 73. When the screw 75 is rotated, the block 73 is pushed against the angled end 58 of the connecting member 57 and slide away thereon, increasing the effective cross-section of the connecting member 57 and locking the same against the interior surface of the first long arm 31.

As apparent on FIGS. 4A and 4B, the second long arm 53 and the connecting member 57 each have a square cross-section. The second long arm 53 is inserted into the connecting member 57 and is sized such that the diagonal dimension of the square cross-section of the second long arm 53 is smaller than the interior width of the connecting member 57.

The resilient members 59 are inserted between the connecting member 57 and the second long arm 53 in such a manner as to create a torque resisting the second long arm

53 rotation relative to the connecting member 57 which is fixed to the first long arm 31 of the rear frame 15. When the resilient members 59 are inserted between the second long arm 53 and the connecting member 57, the rotation of the second long arm 53 inside the connecting member 57 is now restrained by the resilient members 59. In fact, the longer the resilient members 59 extend between the second long arm 53 and the connecting member 57, the stiffer is the torque therebetween. Accordingly, the torque may be adjusted with the length of the resilient member used.

FIG. 4A shows the relative position of the second long arm 53 compared to the position of the connecting member 57 when the wheelchair 11 is resting on even ground. FIG. 4B shows again the relative position of same when one of the caster wheels 55 is higher than the other. According to FIG. 4B and the cross-section from which the figure is taken, the left caster wheel 55 would be higher than the right caster wheel 55.

The resilient members 59 are forced during assembly between the connecting member 57 and the second long arm 53 creating friction therebetween and preventing the second long arm 53 from sliding out of the connecting member 57. Other means known to one skilled in the art are possible to prevent the long arm 53 from sliding out of the connecting member 57. For example, the connecting member 57 may be provided with tongues that may interlock with further tongues or grooves of the second long arm, in such a manner as to prevent the connecting member and the arm from sliding telescopically one into the other.

Such suspension system of the front caster wheels 55 in relation to the rear wheels 35 allows for rotation of one set of wheels in relation to the other creating an angle $\alpha$ between the two sets of wheels so that all the wheels remains in contact with the ground in most conditions. This angle $\alpha$ is preferably limited to$\pm 30°$. This rotation help to reduce to a minimum the skidding of the inside powered wheels (rear wheels 35) in a curve.

The seat assembly 17, as is illustrated in FIGS. 1 and 2, comprises two rear seat supports 61, one on each side of the wheelchair 11 and an arcuate front seat support 63. The two rear seat supports 61 are provided with a series of holes 65 to mount to different heights the rear seat supports 61 to the rear frame 15, allowing for the back of the seat assembly 17 to be raised or lowered. The front seat support 63 is arcuate and is also provided with a series of holes 67 to also mount to different heights the front seat support 63 to the rear frame 15, allowing for the front of the seat assembly 17 to be raised or lowered. Accordingly, the seat assembly 17 may be inclined when the rear seat supports 61 are fixed at one height and the front seat support 63 is raised or lowered.

Figure 5:
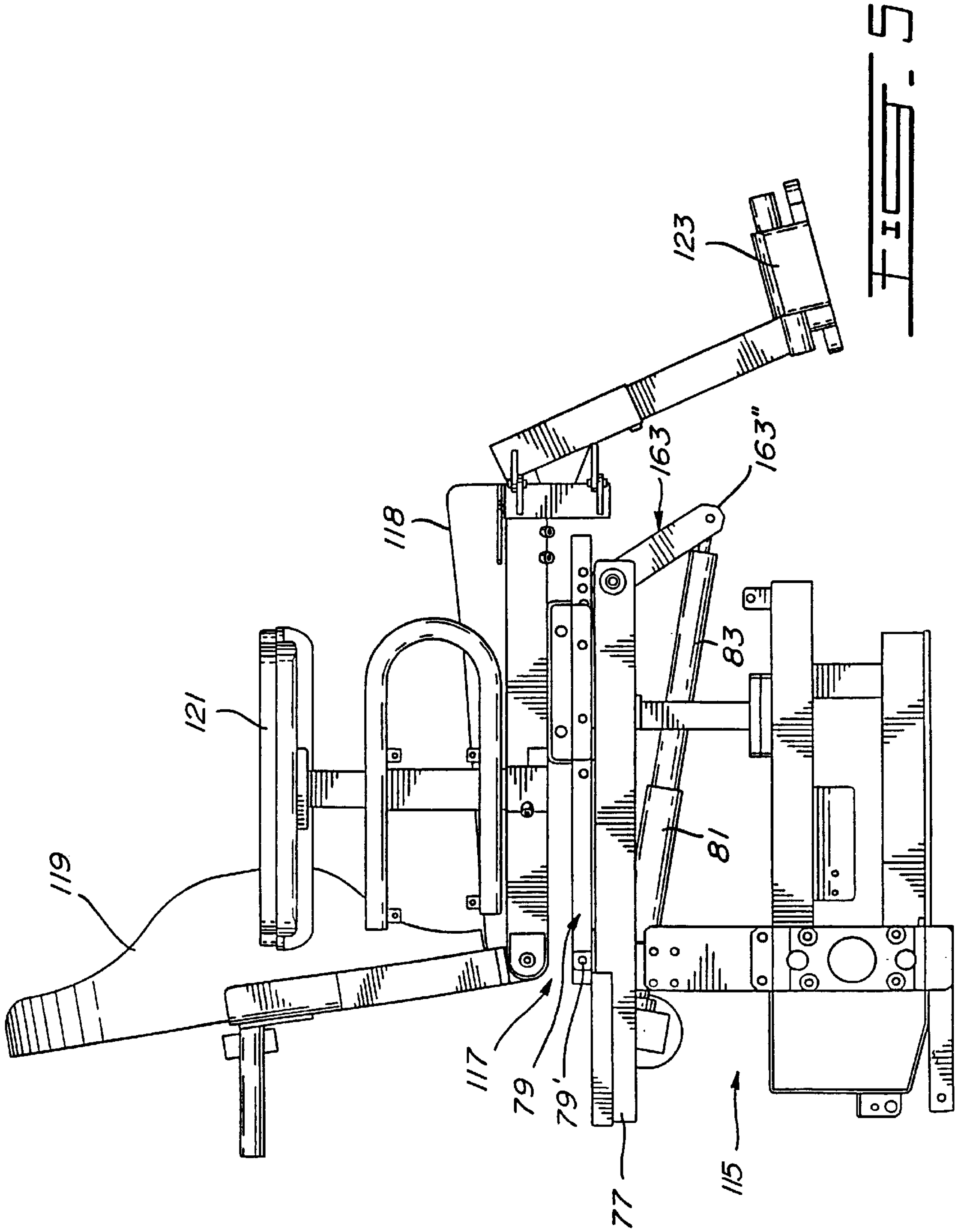
FIG. 5 is a partial side elevation of a wheelchair according to the embodiment of FIG. 1.
Figure 6:
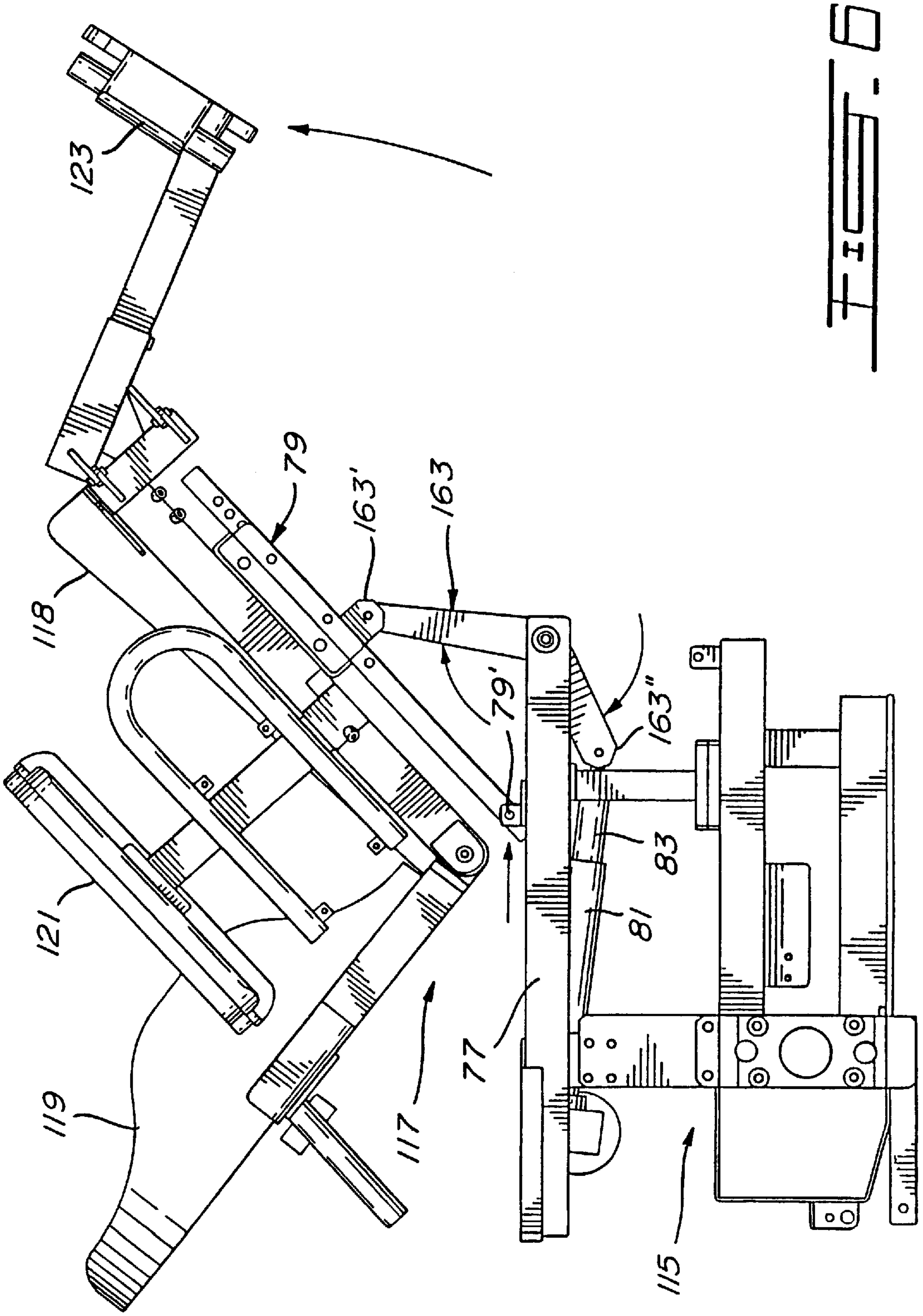
FIG. 6 is a side elevation similar to FIG. 5 illustrating the seating assembly of the wheelchair in a different operative position.

FIGS. 5 and 6 show a preferred embodiment of the invention. The seat assembly 117 has been modified to allow for the seat 118 to be reclined and displaced forwardly to maintain a good stability of the rider even when the latter is reclined in the wheelchair. Normally, reclining a chair displaces the center of gravity toward the rear of a chair. However, with the seat assembly 117 according to this embodiment, the center of gravity of the rider is not affected by the reclining of the seat 118. Therefore, the gravity center remains between the front and rear wheels ensuring a good stability.

According to FIGS. 5 and 6, rails 77 define a frame for the seat assembly 117 and are fixed to the rear frame 115. A sub frame 79 is used to secure the seat 118, the backrest 119, the armrests 121 and the footrests 123. A cylinder 81 having a piston 83 extending therefrom is mounted to the rear frame 115. The piston 83 is connected to a dog leg 163 at one end 163". The dog leg 163 is pivotably mounted at about its center to the sub frame 79. The end 163' of the dog leg 163 is connected to the sub frame 79. A rear end 79' of the sub frame 79 is connected to the rail 77 to slide thereon. Accordingly, when the piston 83 is extended from the cylinder 81 as shown in FIG. 5, the sub frame 79 and the seat 118 are in normal position, which is about horizontal. When the piston 83 is retracted in the cylinder 81 as shown in FIG. 6, the dog leg 163 pivots clockwise around about its center to raise the end 163' thereof. The end 163', being connected to the sub frame, moves the latter upwardly and forwardly. However, since the rear end 79' of the sub frame 79 can only move along the rail 77, the rear end 79' of the sub frame 79 slides forward as indicated by the arrow, reclining the seat 118 mounted thereon and displacing the center of gravity of the user between the wheels.

It is to be understood that the armrests 21 or 121 or the footrests 23 or 123 are optional and that any armrests, footrests or any other accessories known in the art may be used with the present invention.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

We claim:

1. A wheelchair comprising:

a rear frame having a longitudinal axis and comprising at least two parallel wheels rotatably mounted on said rear frame, the axis of the wheels being at right angle to the longitudinal axis of the frame;

a front frame rotatably and telescopically connected to the rear frame about the longitudinal axis, said front frame comprising at least a pair of wheels, and torque means resisting the rotation of the front frame in relation to the rear frame, said front frame telescopically connected to the rear frame allowing for the distance between the wheels of the front frame and the wheels of the rear frame to be varied;

seating means comprising a seating assembly and a back rest, said seating means being mounted for movement, on the rear frame of the wheelchair to elevate and recline said seating means, whereby the center of gravity of the wheelchair, supporting a user, is maintained between the wheels of the front and rear frame to thereby maintain stability; and battery operated motorized means mounted to the rear frame for driving the wheels of the rear frame, wherein the motorized means comprises at least one battery, at least one motor support adjustably mounted on each lateral side of the rear frame, and at least one motor fixed to each motor support and positioned between the rear frame and a respective wheel of the rear frame and a controller unit connected to the battery and the motor for controlling said motor; the wheels at the rear frame being connected directly to the motors and the motor supports for permitting the wheels to be variably spaced apart from the rear frame, whereby said wheelchair is adjustable in length, in width and in height.

2. A wheelchair according to claim 1, wherein the rear frame comprises two wheels, each rotatably mounted on opposite sides of the frame on a common lateral axis.

3. A wheelchair according to claim 1, wherein the pair of wheels on the front frame are caster wheels.

4. A wheelchair according to claim 1, wherein the seat assembly comprises a stand adjustably mounted on the frame and a seat fixed on the stand, said frame allowing for the seat to be raised, lowered or inclined.

5. A wheelchair according to claim 4, wherein the stand of the seat assembly comprises a support, at least one front support adapter and at least one back support adapter, said front and back adapters adjustably mounting the support on the rear frame.

6. A wheelchair according to claim 5, wherein the back adapter is a shock absorber connecting the support of the stand on the rear frame.

7. An adjustable wheelchair comprising:

- a rear T-shaped frame made of two short arms and a first long arm, said first long arm extending in a longitudinal axis, said rear T-shaped frame mounting:
  - two motor supports, each telescopically mounted on one of the two short arms and allowing for adjustability of the distance between each motor support;
  - two motors, each mounted on one of the two motor supports;
  - two wheels, one of each mounted on one of the two motors and driven in rotation by said motors;
- a front T-shaped frame made of two short arms and a second long arm extending in the longitudinal axis and comprising:
  - two caster wheels, one of each rotatably mounted on one of the two short arms of the front frame;
  - a connecting member telescopically mounted to the first long arm, the connecting member and the second long arm each having a polygonal cross-section, and are telescopically arranged with one of the connecting member and the second long arm inserted in the other of the connecting member and the second long arm such that said second long arm can rotate about the longitudinal axis;
  - resilient members inserted between the connecting member and the second long arm of the front T-shaped frame in such a manner as to create a torque resisting the rotation of the front frame in relation to the rear frame.

8. A wheelchair according to claim 7, further comprising a seat assembly comprising:

- a stand adjustably mounted on the rear frame;
- a seat mounted on the stand allowing a user sitting on to be raised, lowered or inclined; and
- a backrest fixed to the stand to allow said user to rest his or her back against.

9. A wheelchair according to claim 8, wherein the stand of the seat assembly comprises a support, at least one front support adapter and at least one back support adapter said front and back adapters adjustably mounting the support on the rear frame.

10. A wheelchair according to claim 9, wherein the back adapter is a chock absorber connecting the support of the stand on the rear frame.

11. A wheelchair according to claim 8, wherein the stand comprises:

- a first support mounted to the rear frame;
- a dog leg pivotably mounted to the support;

- a cylinder and piston mounted at one end of the cylinder to the rear frame and at another end of the piston to one end of the dog leg; and
- a sub frame having a back end slidably fixed to the first support and being provided with a slidable adapter fixed to the other end of the dog leg, said sub frame mounting the seat;

wherein said cylinder and piston bring the dog leg in motion reclining the seat upwardly and forwardly in order to maintain a center of gravity of the wheelchair supporting a user about between the wheels of the front and rear frame maintaining stability.

12. A wheelchair according to claim 7 further comprising at least one battery mounted on the wheelchair for operating the motors.

13. A wheelchair according to claim 12 further comprising a controller unit mounted on the wheelchair and connected to the battery and to the motors for controlling independently said motors.

14. A wheelchair according to claim 7, wherein the connecting member and the long arm of the front frame are of square cross-section, the long arm being sized to be inserted in the connecting member with a 45° rotation in relation to the connecting member.

15. A wheelchair according to claim 14, wherein the resilient member limits the rotation of the front frame to ±30° in relation to the rear frame.

16. The adjustable wheelchair of claim 7, wherein the front frame is telescopically connected to the rear frame allowing for the distance between the wheels of the front frame and the wheels of the rear frame to be varied.

17. A wheelchair comprising:

- a rear frame having a longitudinal axis and comprising at least two parallel wheels rotatably mounted on said rear frame, the axis of the wheels being at right angle to the longitudinal axis of the frame;
- a front frame rotatably connected to the rear frame about a longitudinal axis, said front frame comprising at least a pair of wheels, and torque means resisting the rotation of the front frame in relation to the rear frame; and
- seating means comprising a seating assembly and a back rest, said seating means being mounted on the rear frame of the wheelchair, said seat assembly comprises a stand adjustably mounted on the rear frame and a seat fixed on the stand, said rear frame allowing for the seat to be raised, lowered or inclined, said stand comprising i) a first support mounted to the rear frame; ii) an articulate arm movably fixed to the support; iii) a piston fixed at one end to the rear frame and at another end to one end of the articulate arm; and iv) a second support having a back end slidably fixed to the first support and being provided at a front end with a slidable adapter fixed to another end of the articulate arm, said support mounting the seat; and wherein said piston brings the arcuate arm in motion reclining the seat upwardly and forwardly in order to maintain a gravity center of the wheelchair supporting a user about between the wheels of the front and rear frame maintaining stability.

* * * * *